(12) United States Patent
Freerksen et al.

(10) Patent No.: US 6,557,084 B2
(45) Date of Patent: *Apr. 29, 2003

(54) APPARATUS AND METHOD TO IMPROVE PERFORMANCE OF READS FROM AND WRITES TO SHARED MEMORY LOCATIONS

(75) Inventors: Donald Lee Freerksen, Rochester, MN (US); Sheldon Bernard Levenstein, Austin, TX (US); Gary Michael Lippert, Kasson, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,654

(22) Filed: Jul. 13, 1999

(65) Prior Publication Data

US 2002/0035675 A1 Mar. 21, 2002

(51) Int. Cl.[7] ................................................ G06F 12/00
(52) U.S. Cl. ........................ 711/147; 711/150; 711/151; 711/152; 711/158; 710/28; 710/40; 710/244
(58) Field of Search ................................ 711/158, 146, 711/147, 150–152; 710/28, 40, 244

(56) References Cited

U.S. PATENT DOCUMENTS

| 5,125,083 | A | * | 6/1992 | Fite et al. ................... 712/207 |
| 5,432,918 | A | * | 7/1995 | Stamm ....................... 711/156 |
| 5,524,235 | A | * | 6/1996 | Larson et al. ............... 711/151 |
| 5,909,699 | A | | 6/1999 | Sarangdhar et al. ........ 711/146 |
| 6,003,106 | A | * | 12/1999 | Fields, Jr. et al. .......... 710/129 |
| 6,049,847 | A | * | 4/2000 | Vogt et al. .................. 710/309 |
| 6,079,006 | A | * | 6/2000 | Pickett ....................... 711/213 |
| 6,092,158 | A | * | 7/2000 | Harriman et al. ........... 711/151 |
| 6,105,094 | A | * | 8/2000 | Lindeman .................. 710/107 |
| 6,161,168 | A | * | 12/2000 | Kametani ................... 711/147 |
| 6,237,067 | B1 | * | 5/2001 | Eberhard et al. ........... 711/151 |
| 6,286,083 | B1 | * | 9/2001 | Chin et al. .................. 711/151 |

* cited by examiner

*Primary Examiner*—Reginald G. Bragdon
*Assistant Examiner*—Pierre M. Vital
(74) *Attorney, Agent, or Firm*—Schmeiser Olsen & Watts (57) ABSTRACT

According to the present invention, an apparatus and method for improving reads from and writes to shared memory locations is disclosed. By giving writes priority over reads, the current invention can decrease the time associated with certain sequences of reads from and writes to shared memory locations. In particular, load-invalidate-load sequences are changed to load—load sequences with the current invention. Furthermore, contention for a shared memory location will be reduced in particular situations when using the current invention.

27 Claims, 7 Drawing Sheets

Prior Art

Prior Art

APPARATUS AND METHOD TO IMPROVE PERFORMANCE OF READS FROM AND WRITES TO SHARED MEMORY LOCATIONS

BACKGROUND OF THE INVENTION

1. Technical Field

This invention generally relates to computer system memory and more specifically relates to memory systems that support shared memory locations.

2. Background Art

Today, our society is heavily dependent upon computers for everyday activity. Computers are found in homes, in business offices, and in most production and manufacturing environments. Most computer systems are controlled by a central processing unit (CPU) and have various levels of memory which can be used by the CPU to perform the various functions for which it has been programmed. Typically, computer programs are loaded into the computer system's memory storage areas and executed by the CPU. The programs and data are stored in different areas of the computer system's memory depending on what type of function the CPU is performing. Traditionally, the computer system's memory has been classified as either main memory (primary or main storage) or secondary memory (secondary storage). Programs and data need to be in main memory in order to be executed or referenced by a running program, while programs or data not needed immediately may be kept in secondary memory until needed and then brought into main storage for execution or reference.

In the 1960's, it became clear that the traditional memory storage hierarchy could be extended by one more level with dramatic improvements in performance and utilization. This additional level, the "cache," is a high-speed memory that is much faster than the main memory. Cache storage is relatively expensive when compared with main memory and therefore, in a typical computer system, only relatively small amounts of cache memory are used. In addition, limiting the size of cache storage enhances the speed of the cache.

Cache memory generally operates faster than main memory, typically by a factor of five to ten times and may, under certain circumstances, approach the operational speed of the CPU itself. By keeping the most frequently accessed instructions and/or data in high speed cache memory, average overall memory access time for the system will approach the access time of the cache. There is a certain amount of overhead involved in shuttling information between various memory locations. This overhead is kept as small as possible so that it does not cancel out the performance increase achieved by utilizing cache storage. In addition, if the specific program instruction to be executed or data to be used has been pre-loaded into the cache, the CPU may execute the program instruction or use the data without returning to either main memory or secondary memory, thereby significantly increasing the operational speed of the system.

While adding caches to computer systems has been beneficial, there are additional costs associated with caches, particularly in today's multiprocessing computers. When a cache has a copy of information that also resides in memory, there is the potential that the copy of the information in the cache may not match the copy of the information in the memory. This is most apparent in multiprocessing systems, where there are multiple processors, caches, and either shared or exclusive memories. In these complex systems, a copy of information in one cache may not match copies of this information in other caches or memories.

To prevent potential problems due to these mismatches, engineers have designed coherency protocols. One of the more popular coherency protocols is called MESI, which stands for Modified, Exclusive, Shared, and Invalid. Each acronym letter of MESI stands for one potential state of a cache memory location (usually called a "line"). A cache line in the Modified state means that the cache line has been updated and any copies are currently invalid. A cache line in the Exclusive state means that the cache line has the only copy of the data, but the copy in main memory is valid. When a cache line is in a Shared state, more than one cache may be holding a copy of the line, but the copy in main memory is valid. Cache lines that are in the Invalid state essentially have invalid data.

To support the MESI protocol, processors have a "snooping" mechanism that monitors ("snoops") the system bus. If one processor writes to a line in a cache, the bus controller (which contains the snooping mechanism) for other processors will invalidate their copies of this cache line. Alternatively, the bus controller for the processor that is performing the write could broadcast an invalidate transaction on the system bus to inform other caches that this line has been changed. Regardless of how the other caches learn of the invalidation, the caches that have copies of this line then know that they have old copies and that their processors must request new copies, either from main memory or from the cache that has the new copy of the line. Additionally, snooping mechanisms allow processors and caches to order retries for situations when a recently updated cache line has not yet been written to main memory, but when another processor wishes to read main memory for information contained in the recently updated cache line.

Thus, snooping and MESI work together to ensure cache coherency. Even with coherency protocols, however, there are times when reads from and writes to shared memory locations are not as efficient as they could be.

BRIEF SUMMARY OF INVENTION

According to the present invention, an apparatus and method for improving reads from and writes to shared memory locations is disclosed. By giving writes priority over reads, the current invention can decrease the time associated with certain sequences of reads from and writes to shared memory locations. In particular, load-invalidate-load sequences are changed to load—load sequences with the current invention. Furthermore, contention for a shared memory location will be reduced in particular situations when using the current invention.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

DETAILED DESCRIPTION OF INVENTION

An apparatus and method for improving the performance of reads from and writes to shared memory locations is disclosed. The current invention gives a write to a shared memory location priority over reads of the memory location, once the write to the shared memory location has been rejected at least once. If more than one requester requests a write to a shared memory location, the writes will be given priority on a first-come, first-served basis.

By allowing writes to shared memory locations to have preference over reads, the current invention improves accesses to shared memory locations under certain conditions. In particular, a load-invalidate-load sequence by one processor is changed to a load—load sequence when a preferred embodiment of the current invention is used. This creates a reduction in access time for these accesses. Furthermore, contention for a shared memory location will be reduced when using the current invention in situations where one requestor is waiting for a shared memory location to be updated and another requestor is attempting to update the same shared memory location. When the reading requestor keeps reading the shared memory location, this consistent reading can prevent the writing requester from updating the memory location, as the writer cannot write when the reader is reading. Under these conditions, the current invention provides a performance boost because it gives preference to the writing requester, which allows the shared memory location to be updated quicker.

The current invention will be described primarily in reference to caches and cache memory (made of "cache lines") that contain copies of data from a memory location, but is applicable to any device in a computer system that can share data from a memory location. By "shared" it is meant that more than one device can have a copy of data that exists at a memory location that is in the addressable memory space of the devices having the copies, and that coherency between the copies of the data and the data at the memory location is to be maintained.

Figure 1:
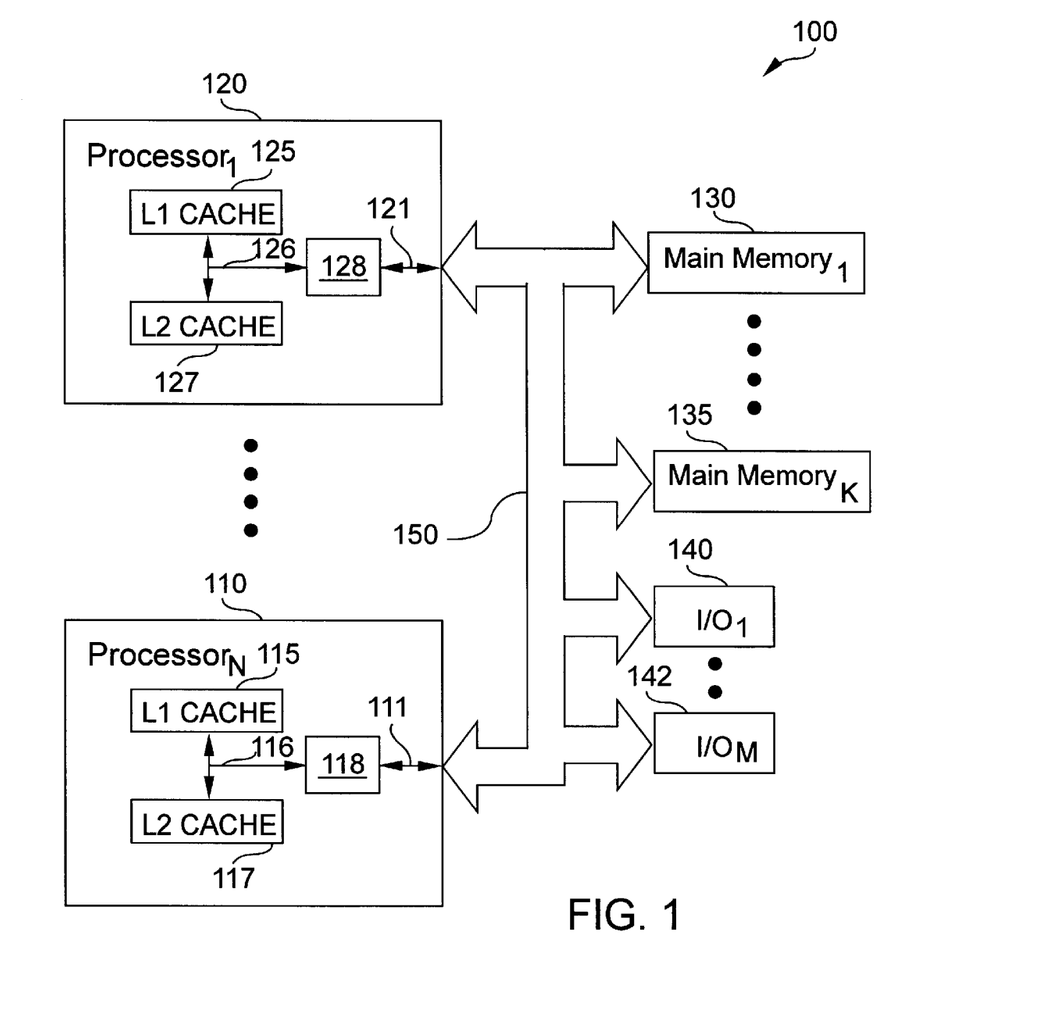
FIG. 1 is a block diagram of a computer system that is used to illustrate a preferred embodiment of the present invention.

Referring now to FIG. 1, this figure contains a block diagram of an example computer system 100 that could benefit from and use the current invention. Computer system 100 comprises multiple processors 110 through 120 that are connected to multiple versions of main memory 130 through 135 by system bus 150. Additionally, system bus 150 is also coupled to input/output devices 140 through 142. Main memories 130 through 135 may be exclusive and local to each processor, may be non-exclusive and local to each processor, or may be grouped together and shared by each processor. Computer system 100 preferably supports Symmetric MultiProcessing (SMP), although other forms of multiprocessing are appropriate.

System bus 150 preferably comprises a command bus, response bus, address bus, data bus, and a control bus, each of which combine to comprise system bus 150. The command bus allows processors (and their bus controllers) to issue commands, while the response bus allows other processors and bus controllers to issue responses to the commands. The address bus allows memory, input/output ports, control registers, programmable logic devices, read-only memories, and the like, to be accessed. The data bus allows data to be transferred between the various constituent elements of FIG. 1 (including those elements that are not shown). The control bus allows control signals to be routed between the elements of computer system 100.

Furthermore, although not shown in FIG. 1, a response combining agent preferably snoops the response bus and combines responses from processors. For instance, if one processor does not allow an access to a shared cache line, but another processor does allow access to a shared cache line, the response controller would then disallow access to the shared cache line. The response controller is a performance enhancement for computer system 100: one processor does not have to wait for responses from all the other processors, as the processor just waits for a response from the response combining agent. However, the current invention is easily implemented without the use of a response combining agent.

Each processor preferably comprises an L1 cache and an L2 cache, along with a bus controller. For instance, processor 120 comprises an L1 cache 125 and an L2 cache 127 that are coupled by bus 126 to bus controller 128, which is itself coupled to system bus 150 by bus 121. Bus controller 128 is responsible for issuing commands on the command bus, snooping the command bus and the response bus, acting on responses, allowing accesses to the L1 and L2 caches, generally communicating over system bus 150, and performing other functions that are known to those skilled in the art. Snooping the system bus, as is also known in the art, informs a cache when lines in the cache are no longer valid (due to another processor's updating a copy of the same line) and when other processors are attempting to access data from main memory before this data has been updated with a new version of the data that exits in one of the caches. Similarly, processor 110 comprises an L1 cache 115 and an L2 cache 117 that are coupled by bus 116 to bus controller 118, which is itself coupled to system bus 150 by bus 111.

The processors, caches, and bus controllers cooperate to ensure cache and memory coherence. The bus controller in one processor will invalidate a copy (generally in a cache line or a portion of a cache line of its processor's L1 or L2 cache) of data from a shared memory location (which exists usually in main memory) when another processor performs a write to another copy of the same cache line. Also, the bus controller will reject accesses to a copy of data from a memory location when its processor has exclusive access to its own copy of the memory location for the purposes of updating the copy. The bus controller will also reject (by issuing a retry) another processor's read from the memory location when the processor corresponding to this particular bus controller has not yet updated the memory location with new data. These concepts are discussed in further detail below.

Other mechanisms for communicating with human users (such as video cards, keyboard inputs, etc.) and with other computers (through parallel ports, wireless ports, network interfaces, etc.) are not shown in FIG. 1 but would likely exist. Buses 121 and 111 are shown as interfacing directly with system bus 150, but these buses would likely have drivers, receivers, and/or buffers prior to interfacing with system bus 150. Furthermore, caches generally have wider bus width than system buses, as is known in the art. The bus interconnecting the L1 cache and L2 cache (shown as bus 126 in example processor 120) may, thus, be wider than system bus 150, and this wider bus would be multiplexed down to the width of system bus 150, as is known in the art. The L2 cache may also be off the processor chip, or additional levels of cache (L3, L4, etc.) may be added on or off the processor ship, as is known in the art. FIG. 1 simply illustrates some of the salient parts of a computer system that are used to discuss the current invention.

Coherency of shared memory locations, and particularly memory locations, in computer system 100 is very important. If one processor, such as processor 120, updates a data from a shared memory location, and another processor, such as processor 110, has a copy of data from this memory location in its cache or in main memory, then the copy must be updated or coherence will be lost. As stated in the background section, one popular coherency protocol for ensuring coherency of shared memory locations (and, in particular, caches having copies of shared memory locations) is the Modified, Exclusive, Shared, and Invalid (MESI) protocol. Each device having copies of data from a shared memory location and each cache shown in FIG. 1 preferably supports the MESI protocol.

As is known in the art, in the MESI protocol, caches generally have tags that include a bit called the modified dirty (altered) bit. This bit is set if a cache line has been updated with new information and therefore contains information that is more recent than the corresponding information in main memories 130 through 135.

The M.E.S.I. protocol is implemented by assigning state bits for each cached line. These states are dependent upon both data transfer activities performed by the local processor as the bus master, and snooping activities performed in response to transactions generated by other bus masters. M.E.S.I. represents four states, which define whether a line is valid (i.e., hit or miss), if it is available in other caches (i.e., shared or exclusive), and if it is modified (i.e., has been modified). The four states are defined as follows:

MODIFIED—This state indicates a line that is exclusively available in only this cache (all other caches are invalid), and is modified (i.e., the main memory's copy is old or "stale"). A modified line can be read or updated locally in the cache without acquiring the memory bus. Because a modified line is the only up-to-date copy of data, it is the cache controller's responsibility to write-back this data to memory on accesses to the old copy of the data that is in main memory. In other words, when another processor wants to access the old data in the main memory and this cache (and its associated processor) has the new data but hasn't yet written the new data to memory, it is up to this cache (through the bus controller), upon learning of the other processor's access by snooping the system bus, to issue a retry response to the other processor and write the new data to main memory. This allows the other processor to access good data.

EXCLUSIVE—Indicates a line that is exclusively available in only this cache (all other caches are invalid), and that this line is not modified (main memory also has a valid copy). Writing to an exclusive line causes it to change to the modified state and can be done without informing other caches or memory. If a read of the main memory location is snooped and the line corresponding to the memory location is in the exclusive state, the line will transition into the shared state.

SHARED—Indicates that this line is potentially shared with other caches. The same line may exist in one or more other caches (main memory also has a valid copy).

INVALID—Indicates that the line is not available in the cache. A read to the memory location corresponding to the cache line will be a miss and cause the cache controller to execute a line fill (i.e., fetch the entire line from main memory and deposit it into the cache).

The states determine the actions of the cache controller with regard to activity related to a line, and the state of a line may change due to these actions. All transactions that may require state changes in other caches are broadcast on the shared memory bus, system bus 150.

Figure 2:
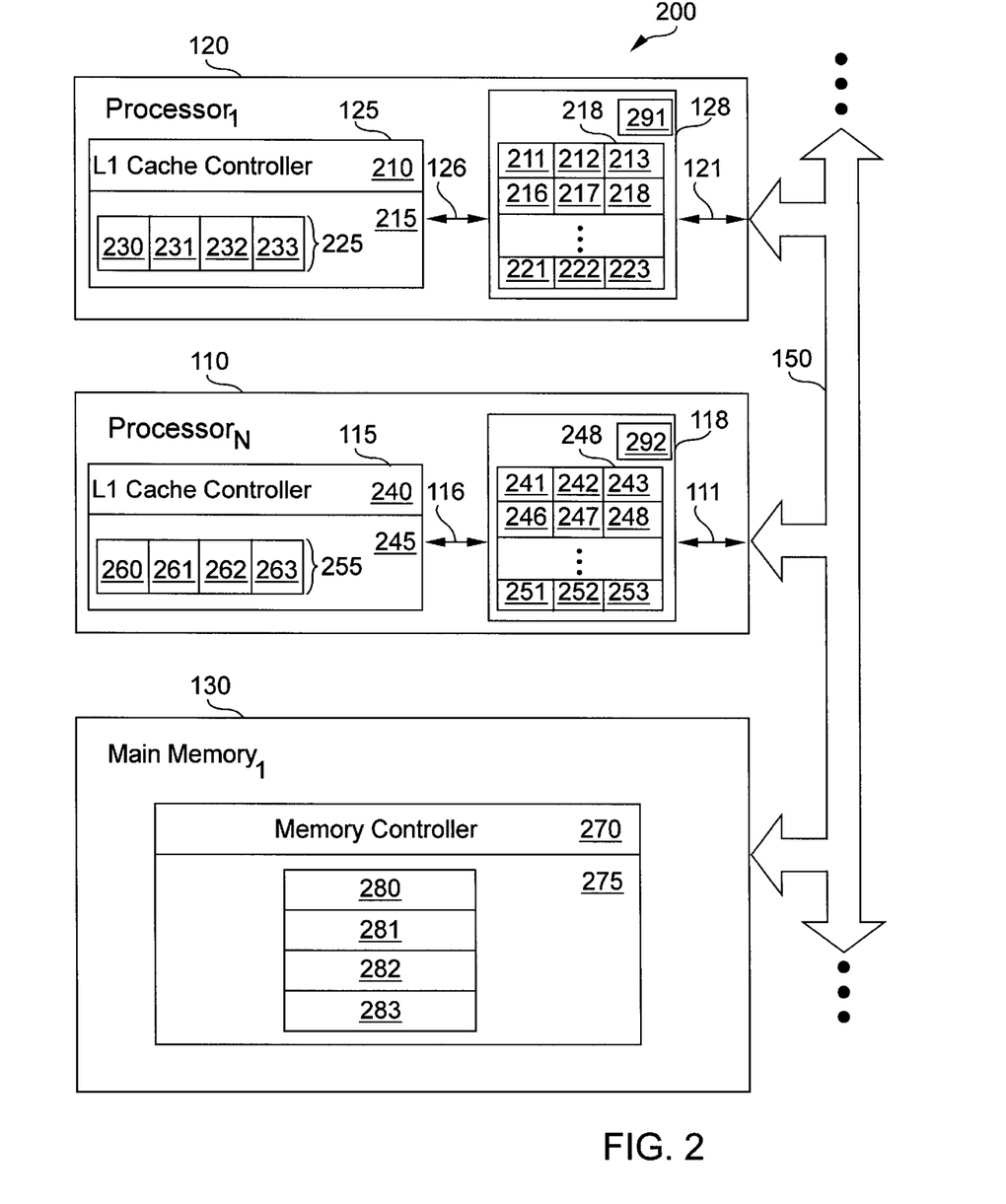
FIG. 2 is a block diagram of two processors, their caches, and main memory that is used to illustrate embodiments of the current invention and prior art.

Turning now to FIG. 2, this figure is a closer examination of processors 120 and 110 as they are connected to one of the main memories, main memory 130, through bus 150 of computer system 200. This figure will be the main figure used to illustrate salient features and embodiments of the current invention. Main memory 130 in this example has a memory controller 270 that is responsible for moving data onto and off the system bus, placing data in appropriate locations, and refreshing (if necessary) data bits within data array 275. Data array 275 contains four memory locations 280, 281, 282, and 283 that each contain data. In the example of FIG. 2, each cache line can contain data from multiple memory locations.

L1 cache 125 in this example has an L1 cache controller 210 that communicates through bus 126 with bus controller 128, which then communicates with system bus 150 through bus 121. The L1 cache also has an array 215 of bits that are divided into cache lines and that contain cache line 225, which comprises four data portions 230, 231, 232, and 233 that correspond to four memory locations 280–283 and the data in these locations. Similarly, L1 cache 115 in this example has an L1 cache controller 240 that communicates through bus 116 with bus controller 118, which then communicates with system bus 150 through bus 111. The L1 cache also has an array 245 of bits that are divided into cache lines and that contain cache line 255, which comprises four data portions 260, 261, 262, and 263 that also correspond to memory locations 280 through 283 and the data in these locations. In this example, each cache line has a width that is wider than, but is a multiple of, the width of system bus 150. The cache bus is then multiplexed to the width of system bus 150, generally before bus controllers 128 and 118.

Each bus controller 128, 118 comprises a store list 218, 248, respectively, of stores (writes) to shared cache lines that are in the process of being performed. Because writes to shared cache lines can take some time to complete, due to contention or other reasons, the store lists (also called write lists) enable the bus controller to keep track of which writes have not yet been completed. Store list 218 comprises a number of addresses 213, 218, and 223 to which the processor is requesting a write. Note that writes to cache lines in the exclusive state are not stored because the processor can immediately write to the cache line.

For each address in store lines 218, a retry count 211, 216, and 221 indicates how many times each write has been rejected, and a priority mode indication 212, 217, and 222 indicate if the write is in priority mode. Similarly, store list 248 comprises a number of addresses 243, 248, and 253 to which the processor is requesting a write. For each address, a retry indication 241, 246, and 251 indicates how many times each write has been rejected, and a priority mode indication 242, 247, and 252 indicate if the write is in priority mode. The number of times a write request has been rejected is important for a number of reasons. For instance, if the write is still not performed after a very high number of tries, then the computer system itself may have a problem. Furthermore, the number might be used to add some randomness to write requests, to avoid cyclic situations, where several processors are trying to perform the same function at the same time. There is an additional use for the retry indications, as discussed below.

Additionally, each bus controller 128, 118 has a programmable retry limit 291, 292, respectively, that indicates the number of retries allowed while a write is in a priority state. Once this number is reached (or exceeded), the bus controller will transition a write from a priority state to a normal state. This number can also be used to toggle going into and out of priority mode, if desired. This will be discussed in more detail below.

The priority state for a write indicates to the bus controller that is performing the write that all reads from other processors to the address for this write are to be rejected. Rejecting reads has performance benefits that will discussed in detail with reference to FIGS. 5 through 8.

The priority indications (212, 217, 222, 242, 247, and 252) indicate whether each write is in a priority state. However, the programmable retry limits 291, 292 and the retry or rejection counts (211, 216, 221, 241, 246, and 251) may be used to determine this information, such that the priority indications are not necessary. For instance, if write has been rejected twice and the programmable retry limit is four, then the bus controller would determine that two rejections are less then the retry limit of four rejections, such that this write should be in the retry mode. Priority will be discussed in more detail with reference to FIGS. 3 and 4.

It should be noted that FIG. 2 is a simple example, and is for discussion purposes only. There are many ways in which computer system 200 may be changed and still operate with the current invention. For instance, main memory 130 could be designed to contain a wide data bus such that main memory 130 is byte, word, double word, and 8-byte (quadword) addressable. Also, the caches could be wide enough to hold many more data elements than are shown, there could be several more levels of cache, etc.

As an illustration of some coherency situations, consider the following example. Assume that memory location 225 is a copy of and corresponds to memory locations 280 through 283, wherein data portion 230 corresponds to data at memory location 280, data portion 231 corresponds to data at memory location 281, etc. Also assume that cache line 255 is a copy of cache line 225. Each cache line would be marked as shared.

Next, assume that processor 120 updates data portion 232 (or the entire cache line 225). To ensure coherency, the other caches must be informed of the pending update. Preferably, when processor 120 receives permission to access cache line 225 (through a response broadcast on the response bus of system bus 150), bus controller 118 snoops this response and invalidates cache line 255. Additionally, bus controller 128 causes cache line 225 to be marked as modified. Alternatively, L1 cache controller 210 can broadcast an invalidate transaction on system bus 150 to inform the other caches of the change. An invalidate transaction generally includes a broadcast of the address corresponding to the data that has been updated, but does not include the data. When bus controller 118 receives the invalidate transaction (as it snoops the command bus of system bus 150), it informs L1 cache controller 240 that this address, which corresponds to cache line 255, is invalid. L1 cache controller 240 marks line 255 as invalid.

At the current time in the current example, processor 120 has not written the data in memory location 225 to main memory 130. Assume that processor 110 (and bus controller 118) begins to perform reads from main memory 130 to retrieve the data at memory locations 280 to 283. The read occurs, for instance, because the processor wants to use the new version of this data. However, the new version of the data is not in main memory. To prevent processor 110 from retrieving the old version of data from main memory, bus controller 128, which snoops bus 150 (in particular, the command bus in system bus 150) and sees the read, broadcasts a retry transaction on the response bus. Processor 110 then stops its read and waits a time to retry the read. Meanwhile, bus controller 128 directs cache controller 210 (and processor 120) to write memory location 225 to main memory. The processor then does write the data to main memory (which takes several transfers because of the bus width disparity) to ensure data coherency. During the update, if processor 110 attempts to read a data element that has not been updated, bus controller 128 will broadcast another retry transaction. Once processor 120 has written the new information to main memory, then bus controller 130 will not issue retries, and the reads by processor 110 can complete.

Figure 3:
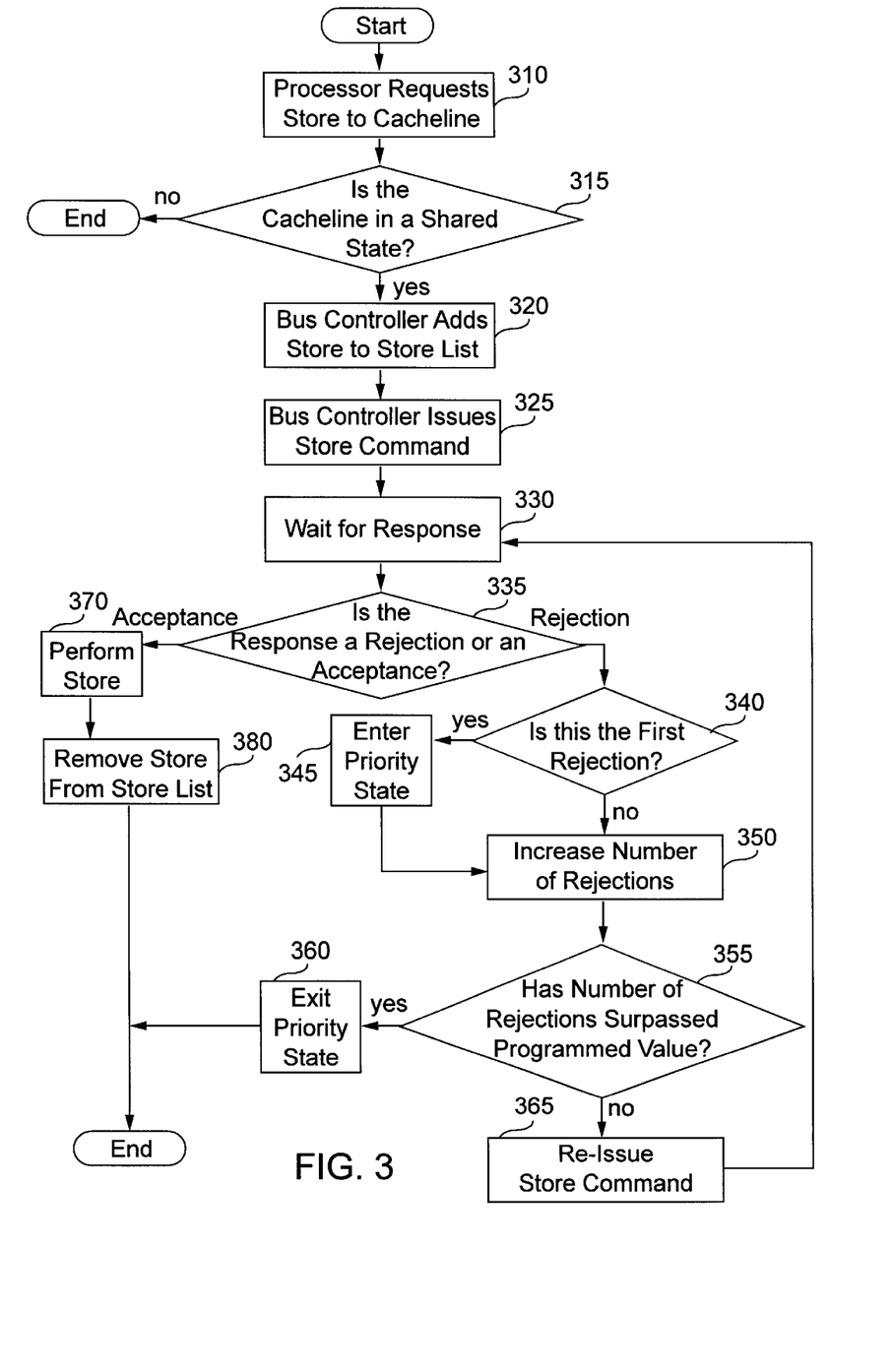
FIGS. 3 and 4 are flow diagrams of the steps taken by an apparatus operating in accordance with a preferred embodiment of the present invention.

Turning now to FIG. 3, FIG. 3 shows a flow diagram of the logical sequence of steps that occur in the most preferred embodiment of the present invention. Note that these steps are not necessarily in order in a time sense, as many of these steps can be performed in parallel. Additionally, any effects due to pipelining (such as performing one request and placing it into the pipe, while rejecting or allowing a second request) are not shown. After discussing this embodiment, particular advantages of the current invention will be discussed in more detail.

FIG. 3 is preferably performed by a bus controller that includes a mechanism to reject accesses to a shared memory location. For caches that are separate from processors, the steps may be performed by a cache controller that has snoop capability. For processors that have internal caches, such as FIGS. 1 and 2 illustrate, the steps may be performed by a bus controller that has snoop capability. The latter configuration will be assumed in all of the upcoming methods. Any mechanism able to perform method 300 may be used for the current invention. Method 300 is performed whenever a processor requests a store to a cache line. The method is also applicable to any device that can read or write to a copy of data at a shared memory location, but caches will be assumed in FIG. 3 for simplicity. Devices from FIGS. 1 and 2 will be discussed here, but will only be infrequently referenced.

Method 300 begins when a processor requests a store to a cache line (step 310). The bus controller then determines if this cache line is in a shared state (step 315), generally by examining state bits corresponding to the cache line. If the cache line is not in the shared state (step 315=no), the method ends. If the cache line is in the shared state (step 315=yes), the bus controller adds the store to the store list (step 320), and then issues the store command (step 325) on the command bus of the system bus.

Because a response can take some time, the bus controller will wait for responses from other processors and bus controllers (step 350). Note that, during this time, the bus controller can still issue commands, act on requests, read/write to memory, etc. Note also that it is preferred that a response combining agent be used, which means that the bus controller will receive only one response and not a multitude of responses from a multitude of processors. Once the bus controller receives the response, it determines if the response is a rejection or an acceptance (step 335). If the response is an acceptance (step 335=acceptance), the bus controller performs the store (step 370), usually by informing the cache controller that it can perform the write. In general, the cache controller holds the data, usually in a register, until it is allowed by the bus controller to write the data into the shared cache line. The bus controller, thus, does not generally perform the store itself, instead, it allows the cache controller to perform the store. The bus controller then removes the store from the store list (step 380). The method ends because the store has been performed. Not that, if the bus controller was in a priority state for this store (write), when the bus controller removes the store from the store list, the priority state is also exited. In the example of FIG. 2, if priority mode indicators are used, these indicators could be set to NO_PRIORITY, if desired.

On the other hand, if the bus controller receives a rejection (step 335=rejection), the bus controller determines if this is the first rejection (step 340). If this is the first rejection (step 345=yes), the bus controller enters the priority state for this store (step 345), which corresponds to an address in the addressable memory space of the processor. The priority state is indicated by priority indications 212, 217, etc., that are shown in FIG. 2. Alternatively, the priority state may also be determined by the bus controller through reference to the retry count 211, 216, etc., and the retry limits 291, 292 that are shown in FIG. 2. If the priority indications are used, the bus controller would determine that this write is in the priority state by changing the priority indication for this write to the value IN_PRIORITY_STATE. If the priority indications are not used, then the fact that this is the first rejection, coupled with the fact that the number of rejections indicated in the retry indication for this write is less than the number of retries allowed by the retry limits, indicate that the priority state should be entered.

Figure 4:
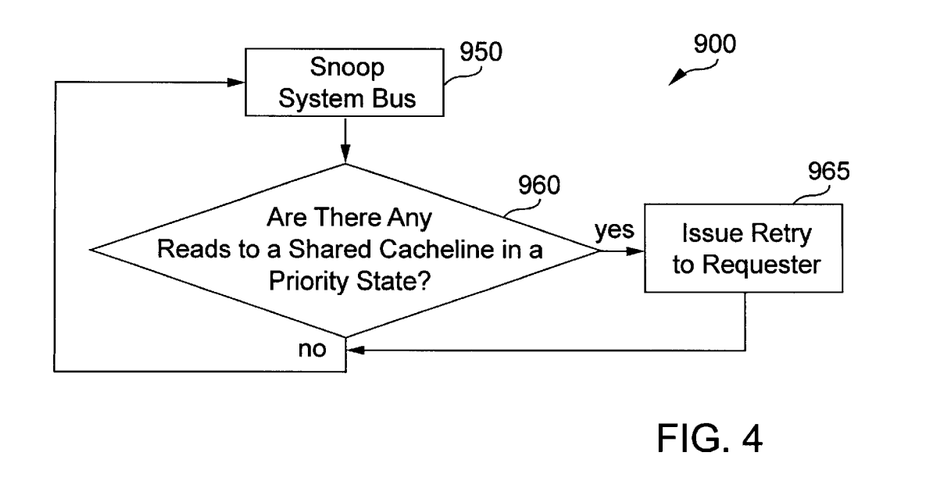

Turning briefly to FIG. 4, FIG. 4 illustrates steps taken by a bus controller when the bus controller has a write in the priority state. When there is a write in the priority state, the bus controller attempting to complete the write (called the "writing bus controller" herein) gives the write priority over reads. To give writes priority over reads, the bus controller rejects requests for reads from other bus controllers to the address that corresponds to the write. Thus, if another processor wants to read a cache line or the main memory location that corresponds to the write address, the bus controller attempting to perform the write will issue a retry response, preferably on the response bus, to the other processor. Note, however, that reads by another processor to its own copy of the memory location, if its copy is marked as shared, will not retried. This occurs because a read to a shared cache line is not broadcast on the system bus. Thus, a read access that is broadcast on the system bus such that other processors know of the access is the accesses that is retried. If the bus controller does not know of the read access, it cannot reject the access. Any read access that is able to be rejected is applicable to the current invention. For most systems, this will be read accesses to the memory location in main memory. Method 900 of FIG. 4 is performed in parallel with the steps of method 300 of FIG. 4, whenever the bus controller is in priority mode for a store.

Method 900 begins when the bus controller snoops the system bus (step 950). To maintain cache and memory coherency, the bus controller should be snooping the system bus during any command on the command bus or any response on the response bus. If there is a read command on the command bus, issued by another processor, to an address (corresponding to a shared cache line that corresponds to a main memory location) that is in the priority state according to the writing bus controller (step 960=yes), this bus controller issues a retry response to the other processor (step 965). Thus, method 900 allows a bus controller to reject reads from copies of a shared memory location or the shared memory location itself if the bus controller has marked the writing address as being in the priority state. The writing address is preferably kept in a write list (shown in as blocks 218 and 248). Note that writes to the writing address are not rejected.

FIG. 4 illustrates that, when the bus controller has at least one write that is in the priority state and is in its write list, the bus controller will reject any reads from copies of data that correspond to the address (which corresponds to a memory location in main memory) in the write list. This allows the prioritization of writes over reads.

Returning to FIG. 3, once the bus controller enters the priority state, the bus controller increases the indication of the number of rejections to this address, preferably by increasing the retry count (such as retry count 211, 216, etc., of FIG. 2) corresponding to this write address in the write list. This step could also occur in or before step 345, but this location is a convenient location for the step, as multiple rejections to multiple write requests will mean that the decision in step 340 will be "no", and that the number of rejections should be increased so that it can be compared with a retry limit (shown as 291, 292 of FIG. 2).

The retry limits act to allow the bus controller to stop the priority mode. Under certain conditions, there may be times when the bus controller cannot finish the write to the cache line within a reasonable time. For instance, if a processor (the "first processor") requested a read of its copy of the data corresponding to a memory address, this processor might not be able to finish the read in a timely manner for a variety of reasons. The bus controller for a second processor might then have its write request rejected by the first processor for a write to its own copy of the data corresponding to this memory address. The bus controller could enter the priority mode for this address, and continually reject read requesters (note that the first processor has already been granted access to the cache line and, thus, should not be retried by the second processor). During the time that the first processor does not read the cache line, the second processor is rejecting read requests and potentially stalling other processors. In addition, contention between two writing processors can, at times, also cause undue delay in allowing accesses to copies of a shared memory location.

To prevent large delays in allowing access to shared memory locations, the bus controller preferably compares the number of current rejections (as indicated by a retry indication) with the number of retries that are allowed (as indicated by a retry limit). The retry limit is preferably programmable to allow designers to choose the best setting for their particular systems. Additionally, the retry limits may be actually performed in a number of ways. For instance, the bus controller could be programmed to exit the priority state when the number of retries exceeds the priority state, equals the priority state, is one less than the priority state, etc., as is known in the art. What is important is that there is a certain number of retries to writes that are allowed before the bus controller will exit the priority state for this write.

If desired, there does not need to be a retry limit. Each write could stay in the priority state for as long as it takes to do the write. However, as previously discussed, there is the limited possibility that there could be a lockout condition wherein reads to copies of data from a shared memory location would be retried for a very long time. Furthermore, the more frequent condition of undue time delay due to normal bus traffic and conditions would cause delays for read requesters of copies of the shared memory location.

The comparison between the retry limit and the number of retries already performed occurs in step 355 of method 300. If the limit has not been surpassed (step 355=no), the bus controller re-issues the store command (step 345), then waits for the response (step 330). Conversely, if the number of retries or rejections has surpassed the number of allowed rejections, the bus controller will exit the priority state for this write (step 360). This can mean that the priority indication (shown in FIG. 2 as 212, 214, 217, 242, 244, and 247) is reset to NO_PRIORITY. Alternatively, the bus controller can determine from the combination of the number of retry counts (shown in FIG. 2 as 211, 213, 216, 241, 243, and 245) and the retry limits as to whether the limit has been exceeded, such that the priority state for this write should be exited. Exiting the priority state is performed on an independent, write-by-write basis. If the bus controller exits the priority state for one write, there can be many, some, or no other writes that are still in the priority state.

When the bus controller exits the priority mode for a write (step 360), the write still will exist in the write list. The normal method of writing to a cache line in the shared state would then be performed, as is known in the art (this method is not shown herein). In the normal state, writes and read are of equal priority and the bus controller will not reject read accesses to cache lines in the shared state or to the main memory location that corresponds to the cache lines. Additionally, it may be beneficial to toggle between the priority and normal, non-priority states. This would allow any read requesters to read shared cache lines, but provide the benefits (two of which are discussed below) of giving a write priority over other reads. In this embodiment, the bus controller would toggle into and out of the priority state or mode for a particular write each time the retry limit is surpassed. For instance, if the retry limit is four retries, the first retry will cause the bus controller to place the write in a priority state, the fifth (or third or fourth, depending on how the bus controller is set up) retry will cause the bus controller to exit the priority state, the sixth through ninth retry will be in the normal write mode, the bus controller again with transition into the priority mode for this write after the tenth retry, etc. Furthermore, the bus controller could be made to stay in the priority state for a certain number of retries, then to stay in the normal write state for a different number of retries.

If desired, there could be a hierarchy of write or store requests. In this embodiment, the memory location controller would hold store requests and grant the store request of the requester having the highest priority. In general, however, the first-come, first-served method works well enough that the added complexity of a priority scheme is not needed.

Thus, the current invention gives store requests priority over load requests, if the store request has been rejected at least once. This prioritization has certain benefits, particularly for load-invalidate-load sequences and contention sequences. To further explore these benefits, more complete analyses of the problems of the prior art systems will be discussed, and the same accesses for a memory location controller using the current invention will be compared with the prior art.

Figure 5:
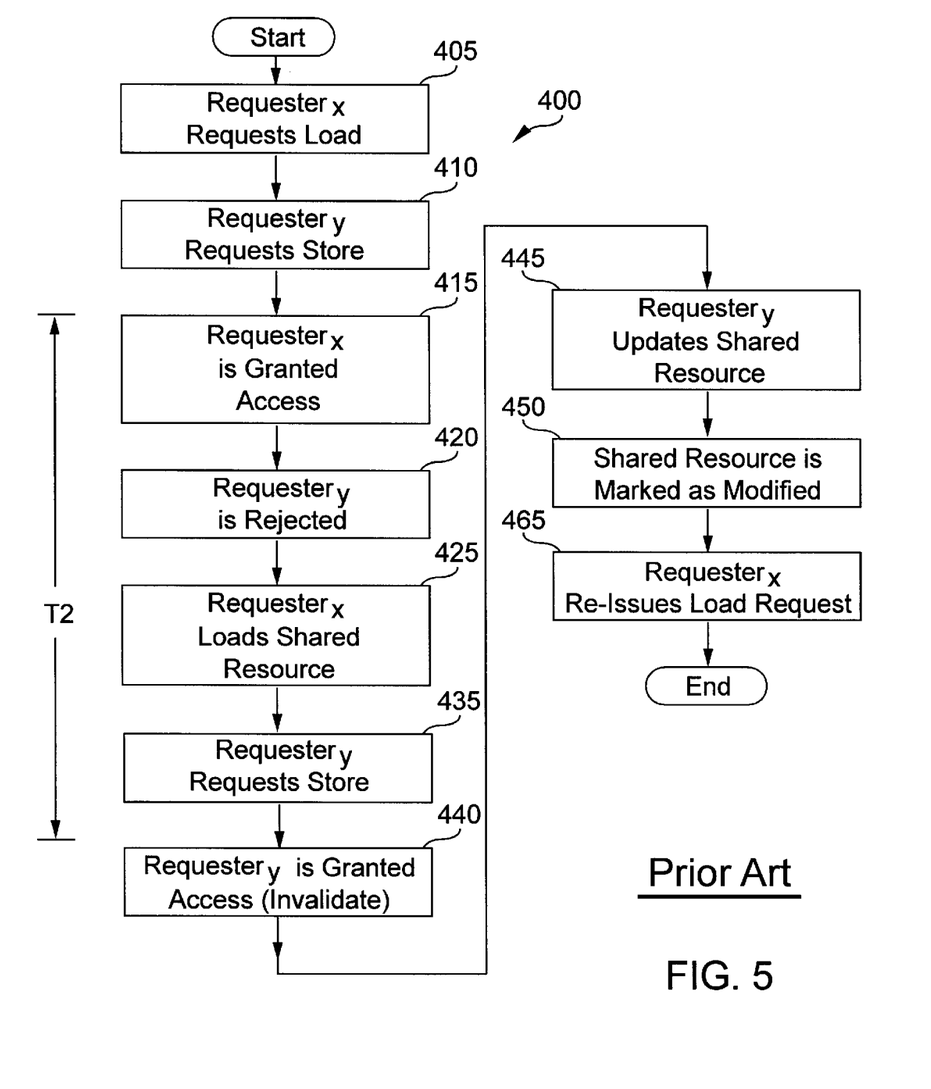
FIG. 5 is a flow diagram that is an analysis of the problem caused by a prior art sequence of a read from and a write to a memory location.

Referring now to FIG. 5 in addition to FIG. 2, in FIG. 5 a prior art load-invalidate-load sequence is shown. FIG. 5 helps illustrate an important problem that memory location controllers face when one requestor reads a value right before the value is changed. FIG. 5 is important in understanding the benefits of the current invention (one of which is explained in FIG. 6). A load-invalidate-load sequence occurs when one bus controller requests, receives acceptance, and reads from a shared cache line. Then another writing requester updates its own copy of this shared cache line (thereby invalidating any copies), and the loading requestor must reload the cache line.

In the example of FIG. 2, processor 110 (called requestor x in method 500 of FIG. 6) is attempting to read from cache line 255, which is marked as invalid and corresponds to addresses 280 to 283 in memory 275. Processor 120 (called requester y in method 500 of FIG. 6) is also attempting to write to its own cache line 225, which is marked as shared and also corresponds to addresses 280 to 283 in memory 275.

Method 400 of FIG. 5 begins when a read requester requests a load from an invalid cache line (step 405). Note that a load from a cache line in the exclusive or shared states may be performed without broadcasting a request. In the example of FIG. 2, processor 110 wishes to load (read) a portion of cache line 255, or the whole cache line. Shortly thereafter, a writing requester, which is attempting to update its copy of this cache line, requests a store. In the example of FIG. 2, processor 120 wants to update memory location 225. In a prior art system, each bus controller operates on a first-come, first-served basis. Thus, bus controller 118 grants access to cache line 255 to the first requestor, processor 110, in step 415 of FIG. 5), which means that processor 110 will access main memory 130 to retrieve the memory locations corresponding to cache line 255. Bus controller 118 then rejects the second requester, processor 120 (step 420), generally by issuing a retry response. Note that the bus controller generally receives responses from other bus controllers (usually through a response combining agent) before granting access to the cache line or shared memory location.

Bus controller 118 then rejects the request by processor 120 (requester y) to write to memory location 225 (step 420). Processor 110 (requester x) reads cache line 255 by accessing main memory and placing the main memory data into the cache line (step 425 of FIG. 5).

In the normal course of events thereafter, the write requester, processor 225 of FIG. 2, requests a store to its own copy of the shared cache line (step 435 of FIG. 5). Bus controller 128 grants access for shared cache line 225 to processor 120 (step 440). The granting of access causes other bus controllers that are snooping the system bus to invalidate their copies of this cache line. Thus, bus controller 118 will cause cache line 255 to be marked as invalid. Alternatively, bus controller 128 could broadcast an invalidate command on the command bus during step 440, which would have the same effect of causing copies of the cache line to be invalidated. Bus controller 128 then writes to and updates the shared cache line (step 445 of FIG. 5). This causes the shared memory location to be marked as modified (step 450). To retrieve an updated copy of the data previously in cache line 255, the load requestor re-issues its load request (step 465).

Although not shown in FIG. 5, when the load requester requests a load (from main memory, because the cache line corresponding to this address is marked invalid), the write requester will reject this access, write the data from the cache line to main memory, and then allow the read requester to read main memory. Thus, bus controller 128 (shown in FIG. 2) will write cache line 225 to main memory 275 and into addresses 280 through 283. In the example of FIG. 2, this write would take multiple transfers on system bus 150 because the cache line's width is four times as wide as the system bus width.

Figure 6:
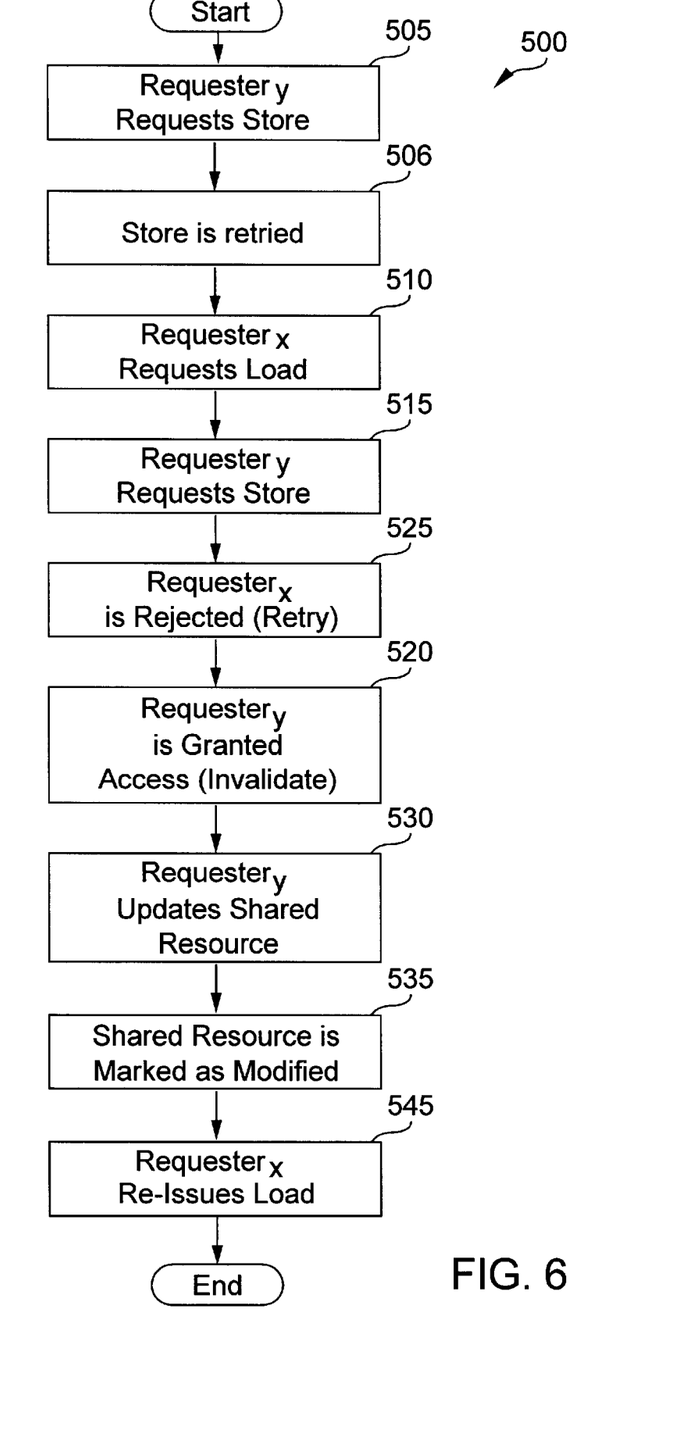
FIG. 6 is a flow diagram of a read from and write to a memory location in accordance with a preferred embodiment of the present invention.

Turning now to FIG. 6 in addition to FIGS. 2, 3 and 4, FIG. 6 shows a potential sequence of events that would happen when the method of FIG. 3 is applied to the prior art system discussed in FIG. 5. In FIG. 6, the bus controller, as part of the write requester, puts this write into a priority state after the write has been rejected at least once. The priority state causes this bus controller to reject any reads from shared cache line that correspond to this memory location. This allows the write requester to more quickly, in most situations, write into the shared cache line.

Method 500 starts when a write requester's write request (step 505) is rejected (step 506). For instance, in FIG. 2, when processor 120 requests, through bus controller 128, to write to shared cache line 225, some other processor and its bus controller has issued a retry response on the command bus of system bus 150. The retry causes the write requester and its bus controller to enter the priority mode for this write (step 506 of FIG. 6 and step 345 of FIG. 3).

As in FIG. 5, a read requester requests a load (step 510 of FIG. 6) of an address shortly before a write requester requests a store (step 515 of FIG. 6). Because the bus controller and write requester has the current address in priority mode, the bus controller then rejects the request for the load by the read requester (step 965 of FIG. 4 and step 525 of FIG. 6).

The write requester then is granted access to the shared resource (515), causing the other copies of the resource to be invalidated. The write requester then updates the shared resource (step 530 of FIG. 6), the bus controller marks the shared resource as modified (step 535). The read requester then re-issues its load request (step 545). Note that, if the read requester re-issues its load request before the write is finished, the bus controller would issue a retry to the read requester.

Thus, the load-invalidate-load sequence of the load requester has been changed to a load—load sequence. Returning to FIG. 5, the time period T2 by prior art is not applicable to a system using the current invention. The current invention, thus, reduces the time required to access a shared memory location by at least the time indicated by time T2 of FIG. 5. Essentially, the time that the load requester takes to retrieve the first copy of the shared resource is the time saved by the current invention.

In the example of FIG. 2, when processor 110 requests to read shared cache line 255, and processor 120 also requests to write to cache line 225, bus controller 128, which is already in the priority mode for this address, chooses to grant processor 120's request. This occurs because writes to a shared cache line are given priority over reads of the shared cache line. The bus controller rejects processor 110, and will continue to reject processor 110's reads to cache line 255 until the write by processor 120 to the cache line 225 completes. Once the write completes, processor 110 can then proceed to get a copy of the newly updated data by accessing main memory (step 545).

Figure 7:
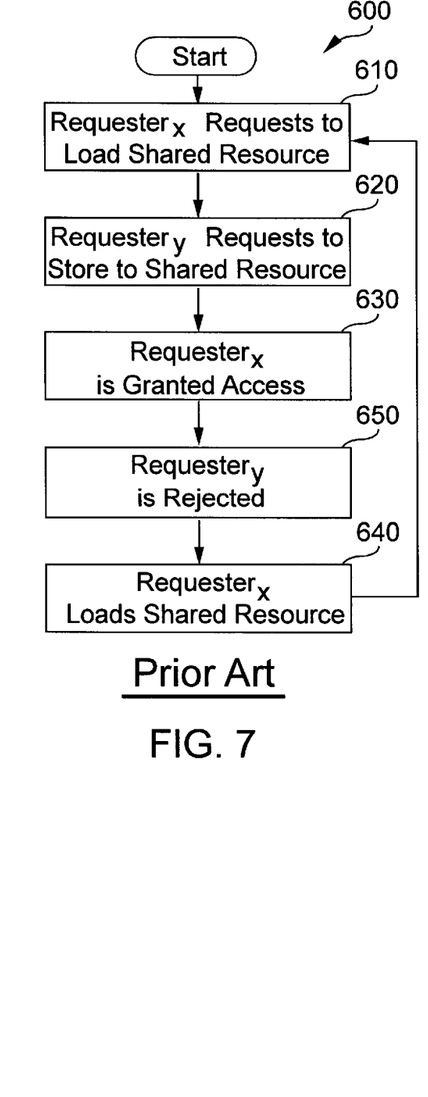
FIG. 7 is flow diagram that is an analysis of the problem caused by a prior art contention between two processors for a shared memory location.

Turning now to FIG. 7 in addition to FIG. 2, FIG. 7 shows a potential sequence of events in a prior art computer system. This figure illustrates contention for a shared resource in a computer system. The scenario is that one or more requesters are examining the shared resource, waiting for the shared resource to be changed, as another requestor is attempting to change the shared resource. The more often and quicker that the read requester reads the shared resource, the less likely it is that the write requestor can write to the shared resource, as the shared resource cannot be written when it is being read. For caches, the shared resource will generally be a memory location in main memory, and one or more caches will contain a copy of the data at this location. The cache lines having the copy are marked as shared. Normal cache coherence protocols apply.

Method 600 starts when the read requester requests to load (read) from the shared resource (step 610). The write requester then requests to store (write) to a copy of the shared resource or to the shared resource (step 620). In the prior art system, the bus controller operates on a first-come, first-served basis, so it grants the load request (step 630) and rejects the write request (step 650). The load requester reads the shared resource (step 640). If the load requester again requests the shared resource before the write requester can be granted permission to change the shared resource or its copy, the series of steps in FIG. 7 can be repeated many times before the shared resource or the copy is updated. This is particularly true if many read requesters are requesting reads to the shared resource. Exactly how many times the steps are performed is a function of how the computer system is configured, how the routine for reading the shared resource is written, what the bus traffic is, etc.

In the example of FIG. 2, a shared resource could be any shared, addressable memory location in the system, including memory locations from caches 125 and 115, memory locations in main memory 130 (such as those being used for a semaphore), or registers (not shown in FIG. 2). Primarily, however, cache lines from caches will contain copies of a main memory location. Any bus controller that can control shared memory locations is applicable to the current invention.

As an example, assume that cache line 225 corresponds to and contains a copy of data in memory location 280, which contains a semaphore. If processor 120 wants to write to its copy of the semaphore, while processor 110 wants to read its copy of the semaphore, a contention loop (the repetition of steps in method 600) may occur. This is particularly true if cache line 255 of processor 110 is marked as invalid, such that the processor 110 must get a current copy of the cache line by reading the shared resource (memory location 280). The former situation is possible, but occurs infrequently, while the latter situation occurs much more frequently.

Figure 8:
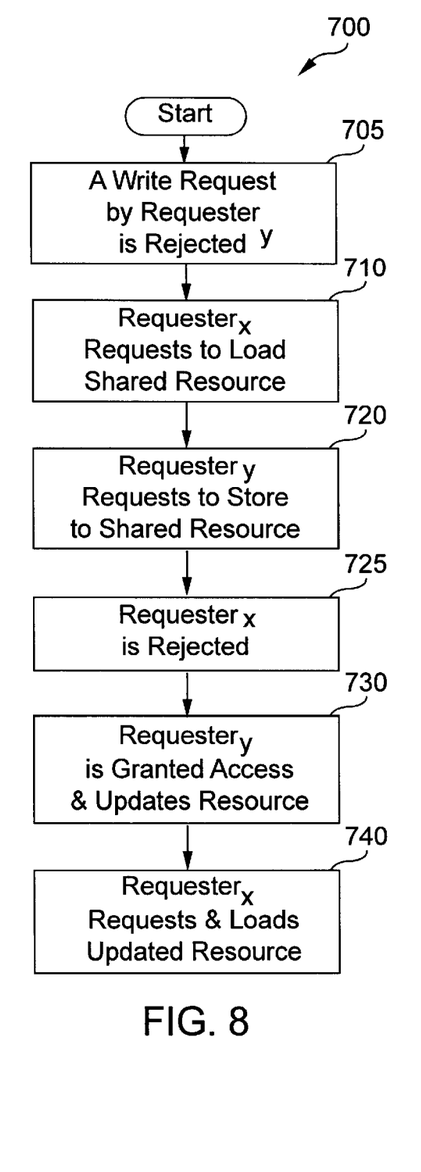
FIG. 8 is a flow diagram of contention between two processors for a shared memory location in accordance with a preferred embodiment of the present invention.

Because the current invention gives writes to a shared resource priority over reads, there will be less of a chance of one or more read requesters essentially locking out a write requester because of the numerous reads by the read requesters. FIG. 8 illustrates a system that is using the most preferred embodiment of the present invention.

Method 700 of FIG. 8, starts when a write by a write requester (requester y) is rejected (step 705). This causes the write requester and its bus controller to enter the priority mode for this write. A read requester then requests to load (read) a shared resource (step 710). Shortly thereafter, the write requester that has the write in priority mode requests to store to the shared resource (step 720). Because the bus controller for this write requester has marked this write as being prioritized, the bus controller rejects the read for the shared resource (step 725). The bus controllers grants access for the shared resource to the write requester, which updates the shared resource (step 730). The load requester will then request and load the updated shared resource after the write completes (the load requester will be rejected while the write takes place). This occurs in step 740. If a cache line contains a copy of the shared resource, the load requester will have to get the new version of the copy from main memory.

Thus, the current invention limits potential vicious cycles caused by one requester trying to continually read a shared memory location that another requester is trying to update.

As the previous figures illustrate, by giving writes priority over reads, the current invention can decrease the time associated with certain sequences of reads from and writes to shared memory locations. In particular, load-invalidate-load sequences are changed to load—load sequences with the current invention. Furthermore, contention for a shared memory location will be reduced in particular situations when using the current invention.

Although the current invention has been discussed in reference to L1 caches, the invention is equally applicable to other levels of cache, such as L2, L3, L4, etc., or to main memory, or to any other shared memory location.

While the invention has been particularly shown and described with reference to preferred embodiments thereof, it will be understood by those skilled in the art that various changes in form and details may be made therein without departing from the spirit and scope of the invention.

What is claimed is:

1. A method for controlling direct accesses by at controller to shared memory locations in a computer system during Limes of address conflict, the computer system comprising a plurality of processors, a plurality of caches, a plurality of bus controllers, and at least one main memory comprising a plurality of memory locations, the method comprising the steps of:

providing a write list comprising a plurality of writes, each write corresponding to one of the plurality of memory locations;

providing a first controller of the plurality of bus controllers that is coupled to a first processor of the plurality of processors and to a first cache of the plurality of caches, the first bus controller able to enter a priority mode for each of the writes in the write list;

receiving a direct read request by the controller to read from a memory location of the plurality of memory locations;

determining if the memory location is shared;

accessing the write list to determine, if the memory location is shared, if there is a write that is scheduled to a cache line associated with the first cache and corresponding to the memory location;

determining if the write corresponding to the memory location is in the priority mode; and rejecting the direct read request by the controller by issuing a retry command to the controller if there is the write scheduled for the memory location and the write is in the priority state;

requesting to perform the write to the cache line that corresponds to the memory location; and entering the priority mode for the write if the request to perform the write is rejected.

2. The method of claim 1, further comprising the steps of exiting the priority mode for the write when a predetermined number of requests to perform the write have been rejected;

entering a normal mode for the write; and allowing direct read accesses by the controller to cache line and to the memory location while in the normal mode.

3. The method of claim 2, wherein the predetermined number of requests is programmable.

4. The method of claim 1, further comprising the steps of:

exiting the normal mode for the write when a predetermined number of requests to perform the write have been rejected; and alternating between the normal mode and the priority mode for the write until the write is performed.

5. The method of claim 1, wherein the step of rejecting the direct read request by the controller comprises the steps of:

snooping a bus to determine the direct read request by the controller; and issuing a retry response on the bus.

6. The method of claim 1, further comprising the step of completing the write to the cache line.

7. A system, comprising a bus controller for controlling direct accesses by at least one other controller to shared memory locations, the bus controller coupled to a bus and the bus coupled to a main memory, the main memory comprising a plurality of memory locations, the bus controller rejecting direct read accesses by the at least one other controller to a first memory location of the plurality of memory locations during times of address conflict by issuing a retry command to the at least one other controller when the bus controller is in a priority mode for a first write that corresponds to the first memory location, wherein the bus controller enters the priority mode for the first write when a request to perform the first write has been rejected.

8. The system of claim 7, wherein the bus controller exits the priority mode and enters a normal mode for the first write when a predetermined number of requests to perform the first write have been rejected, the bus controller in the normal mode allowing direct read accesses by the at least one other controller to the first memory location.

9. The system of claim 8, wherein the predetermined number of requests is programmable.

10. The system of claim 8, wherein the bus controller exits the normal mode for the first write when the predetermined number of requests to perform the first write have been rejected, the bus controller alternating between the normal mode and the priority mode for the first write until the first write is performed.

11. The system of claim 2, wherein the bus controller rejects direct read accesses by a second controller by snooping the bus to determine that a direct read access is requested by the second controller and by issuing a retry response on the bus.

12. The system of claim 7, wherein the bus controller is coupled to a copy of the first memory location, cud wherein the bus controller allows a direct update to the copy of the first memory location.

13. A system, comprising a bus controller for controlling direct accesses by at least one other controller to shared memory locations, the bus controller coupled to a bus and the bus coupled to a main memory, the main memory comprising a plurality of memory locations, the bus controller rejecting direct read accesses by the at least one other controller to a first memory location of the plurality of memory locations during times of address conflict by issuing a retry command to the at least one oilier controller when the bus controller is in a priority mode for a first write that corresponds to the first memory location, wherein the bus controller comprises a write list that comprises at least one write, each of the at least one write corresponding to a second memory location of the plurality of memory locations, wherein each of the at least one write may be in a priority mode such that the bus controller will reject direct read accesses by a second controller to a second memory location when the bus controller is in a priority mode for a second write in the write list that corresponds to the second memory location.

14. A computer system comprising:
   a) at least one main memory that comprises a plurality of memory locations for containing data, the at least one main memory coupled to a bus;
   b) at least one processor coupled to the bus;
   c) at least one cache memory coupled to the bus, the at least one cache memory comprising a plurality of cache lines for containing data, each cache line able to be in one of a plurality of states, wherein a shared stale is one of the plurality of states;
   d) at least one bus controller that is coupled to the bus, the at least one bus controller for controlling direct accesses by the at least one processor to and from the bus and for rejecting and allowing read and write accesses by at least one other controller to cache lines of the plurality of cache lines that are in the shared suite and that contain copies of data from memory locations of the plurality of memory locations, the at least one bus controller comprising a write list that is able to contain a plurality of writes, the at least one bus controller able to be in a priority mode for each of the plurality of writes such that the at least one bus controller will reject direct read accesses by the at least one other controller to the memory locations during times of address conflict by issuing a retry command to the at least one other controller if a cache line corresponding to a memory location of the plurality of memory locations is in the shared state when the at least one bus controller is in the priority mode for a write of the plurality of writes and the write corresponds to the memory location; and
   e) wherein the cache line contains data from the memory location, and wherein the at least one bus controller for the at least one processor rejects direct read accesses by the at least one other controller to the memory location during times of address conflict by issuing a retry command to the at least one oilier controller when the at least one bus controller for the at least one processor is in the priority mode for the write.

15. The computer system of claim 14, wherein the at least one bus controller enters the priority mode for the write when a request to perform the write has been rejected.

16. The computer system of claim 15, wherein the at least one bus controller exits the priority mode and enters a normal mode for the write when a predetermined number of requests to perform the write have been rejected, the at least one bus controller in the normal mode allowing direct read accesses by at least one other controller to cache lines corresponding to the memory location when the bus controller is in the normal mode for the write.

17. The computer system of claim 16, wherein the predetermined number of requests is programmable.

18. The computer system of claim 16, wherein the at least one bus controller exits the normal mode for the write when a predetermined number of requests to perform the write have been rejected, the at least one bus controller alternating between the normal mode and the priority mode for the write until the write is performed.

19. The computer system of claim 14, wherein the at least one bus controller rejects direct read accesses by the at least one other controller by snooping the bus to determine that a direct read access by at least one other controller is requested and by issuing a retry response on the bus.

20. The computer system of claim 14, wherein each cache line in the at least one cache further is able to be in the exclusive, modified, or invalid states.

21. The computer system of claim 14, wherein the at least one processor is a plurality of processors, the at least one cache is a plurality of caches, the at least one bus controller is a plurality of bus controllers, and wherein there is at least one cache and at least one bus controller per processor of the plurality of processors.

22. A method for controlling direct accesses by a controller to shared memory locations during times of address conflict in a computer system, the method comprising the steps of:
   receiving a direct read request by the controller to read from a memory location;
   determining if the memory location is shared;
   determining, if the memory location is shared, if there is a write that is scheduled for the memory location arid that is in a priority mode; and
   rejecting the direct read request by the controller by issuing a retry command to the controller if there is the write scheduled for the memory location and in the priority state,
   requesting to perform the write to a copy of die memory location; and
   entering the priority mode for the write if the request to perform the write is rejected.

23. The method of claim 22, further comprising the steps of:
   exiting the priority mode for the write when a predetermined number of requests to perform the write have been rejected;
   entering a normal mode for the write; and
   allowing direct read accesses by the controller to the memory location that corresponds to the write while the write is in the normal mode.

24. The method of claim 23, wherein the predetermined number of requests is programmable.

25. The method of claim 22, further comprising the steps of:
   exiting the normal mode for the write when a predetermined number of requests to perform the write have been rejected; and
   alternating between the normal mode and the priority mode for the write until the write is performed.

26. The method of claim 22, wherein the step of rejecting the direct read request by the controller comprises the steps of:
   snooping a bus to determine the read request; and
   issuing a retry response on the bus.

27. The method of claim 22, further comprising the step of completing the write to the copy of the memory location.

* * * * *

UNITED STATES PATENT AND TRADEMARK OFFICE
CERTIFICATE OF CORRECTION

PATENT NO. : 6,557,084 B2
DATED : April 29, 2003
INVENTOR(S) : Donald Lee Freerksen, Sheldon Bernard Levenstein and Gary Michael Lippert It is certified that error appears in the above-identified patent and that said Letters Patent is hereby corrected as shown below:

Column 15,
Line 29, "Limes" should be -- times --.

Column 16,
Line 52, "cud" should be -- and --.
Line 63, "oilier" should be -- other --.

Column 17,
Line 23, "suite" should be -- state --.
Line 44, "oilier" should be -- other --.

Column 18,
Line 25, "arid" should be -- and --.
Line 31, "die" should be -- the --.

Signed and Sealed this

Twenty-sixth Day of August, 2003

JAMES E. ROGAN
*Director of the United States Patent and Trademark Office*